Dec. 18, 1956  H. M. HERBENER  2,774,073
LADIES' GIRDLES
Filed April 30, 1954  3 Sheets-Sheet 1

INVENTOR.
Henry M. Herbener
BY
ATTORNEY

Dec. 18, 1956  H. M. HERBENER  2,774,073
LADIES' GIRDLES
Filed April 30, 1954  3 Sheets-Sheet 2

INVENTOR.
Henry M. Herbener
BY
ATTORNEY

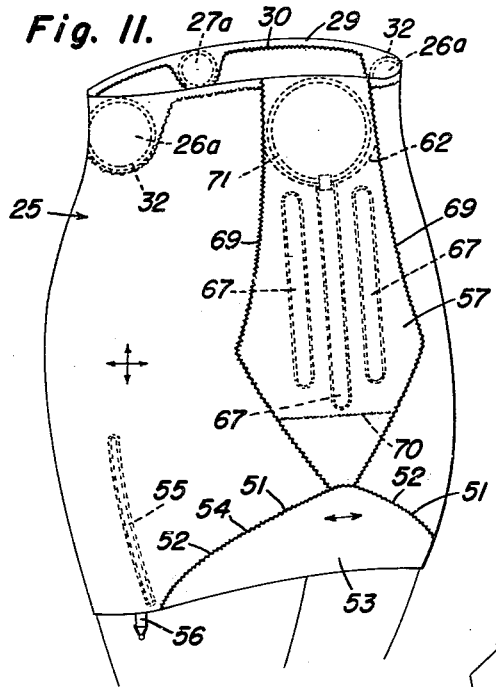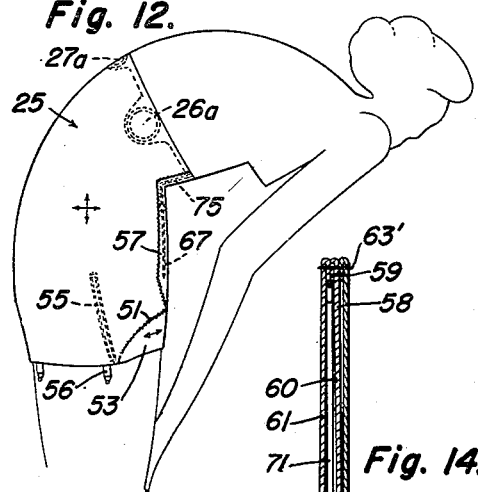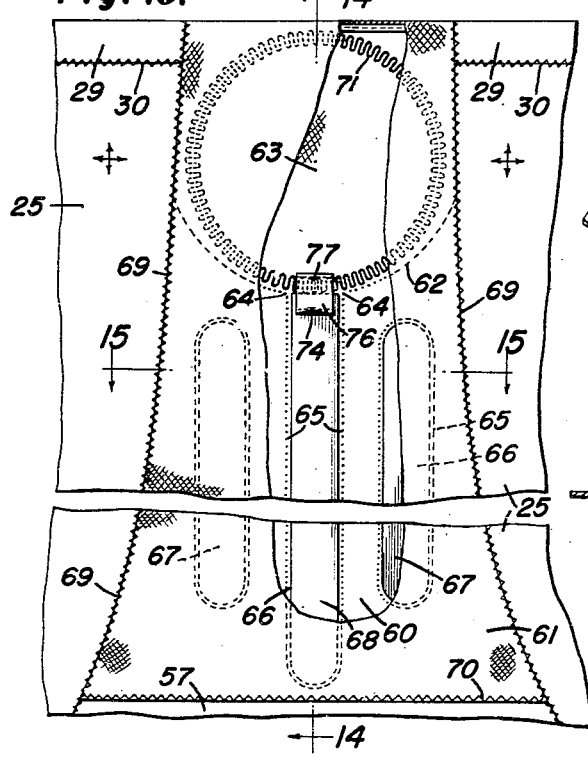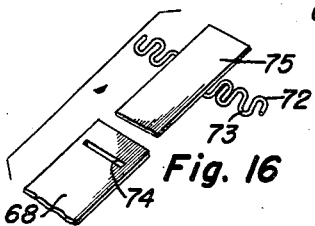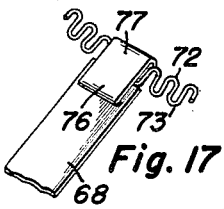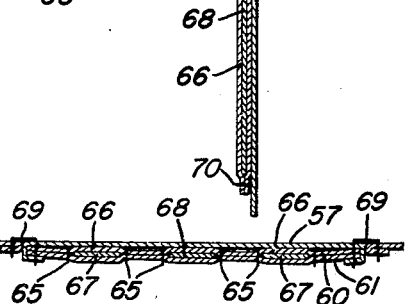

United States Patent Office 2,774,073
Patented Dec. 18, 1956

2,774,073
LADIES' GIRDLES

Henry M. Herbener, Thomasville, Ga.

Application April 30, 1954, Serial No. 426,691

10 Claims. (Cl. 2—36)

My invention relates to improvements in ladies' girdles, corsets, brassieres or the like.

An important object of the invention is to provide a garment of the above-mentioned character which will produce the maximum comfort and maximum body control and good appearance with the minimum interference of freedom of movement of the wearer.

A further object of the invention is to provide a resilient device which will bend in all directions and conform to curvatures of the body and at the same time retain the top of the garment elevated.

A further object of the invention is to provide a device for supporting the upper portion of the garment and so constructed that when it is held within a pocket and the material of the pocket shrinks due to washing, the device will continue to operate properly and no puckering occurs.

A further object of the invention is to provide a device for supporting the garment in place upon the wearer without interfering with the elasticity of the garment.

A further object of the invention is to provide means to return the top of the front portion of the garment to the raised position, when depressed, and which will also serve as body control for the abdomen.

A further object of the invention is to provide means serving as body control for the abdomen, and also serving to prevent forward movement of the lower portion of the resilient means which supports the top of the garment.

A further object of the invention is to connect the lower portion of the resilient supporting means and the upper portion of the body control means.

A further object of the invention is to provide a resilient frame or hoop formed of wire bent in a zig-zag formation thereby forming alternately arranged oppositely facing hoops, at least some of which are generally radially arranged.

A further object of the invention is to provide a frame or hoop which is flat so that the parts thereof may be arranged in the same plane when not under tension, and a connecting device for securing the ends of the frame or hoop together, and opposing distortion of the frame or hoop so that the parts thereof will be retained in a single plane when not under tension.

A further object of the invention is to provide a resilient supporting frame or hoop and a lower coacting device, and a stiff coupling for connecting the ends of the frame or hoop together and for connecting the lower portion of the frame or hoop with the upper portion of the device.

A further object of the invention is to provide upper and lower frames or hoops formed of wire bent into a zig-zag formation, with a stiff coupling connecting the ends of each frame or hoop and also connecting the adjacent portions of the upper and lower frames or hoops.

A further object of the invention is to provide a resilient frame or hoop formed of wire bent into zig-zag formation and a stiff coupling clamped to the lower portion of the frame or hoop and clamped to the upper end of a stiffening rib.

Other objects and advantages of the invention will be apparent during the course of the following description.

In the accompanying drawings forming a part of this application and in which like numerals are employed to designate like parts throughout same, Figure 1 is a perspective view of a girdle embodying my invention, Figure 2 is a side elevation of the girdle, showing the user stooping forwardly, Figure 3 is an elevation of the inner side of the front of the girdle, upon an enlarged scale with respect to Figure 1, parts broken away.

Figure 7:
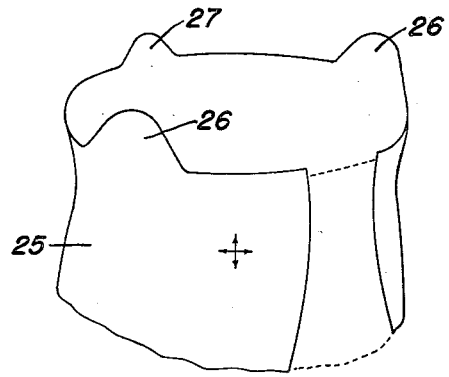
Figure 8:
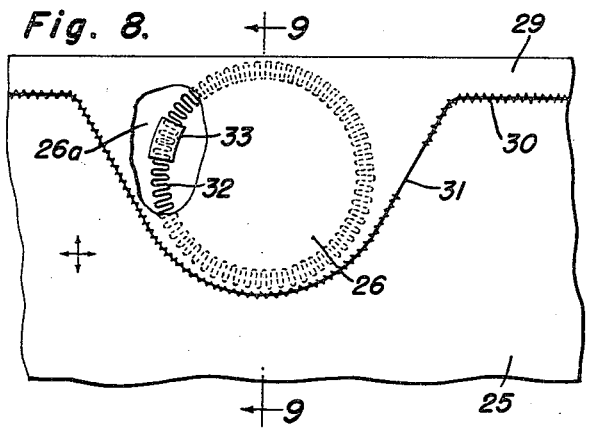
Figure 9:
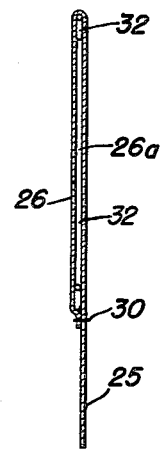
Figure 10:
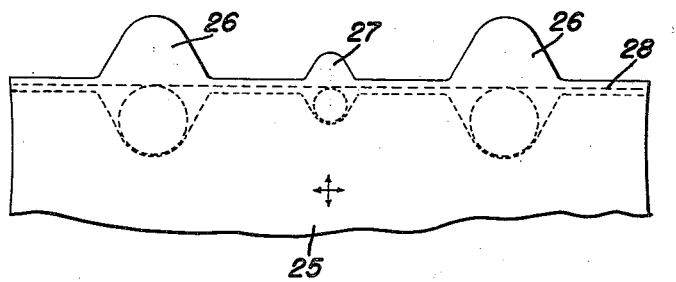
Figure 11A:
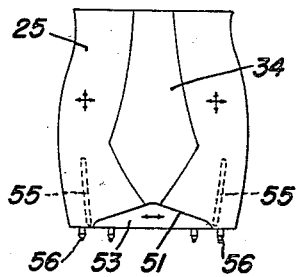

Figure 7 is a perspective view of the body portion of the girdle showing the pocket forming sections at the top and before they are folded over, Figure 8 is an enlarged side elevation of one pocket, parts broken away, Figure 9 is a vertical section taken on line 9—9 of Figure 8, Figure 10 is a side elevation of the elastic fabric forming the body portion of the girdle, arranged in a flat position, to further illustrate the pocket forming section, Figure 11a is a front elevation of the girdle, largely diagrammatic, showing the arrangement of the ribs and hose supporters, Figure 11 is a front perspective view of a second form of girdle embodying my invention, Figure 12 is a side elevation of the same, showing the wearer stooping forwardly, Figure 13 is an inner side elevation of the girdle, looking forwardly, parts broken away, Figure 14 is a vertical section taken on line 14—14 of Figure 13, Figure 15 is a horizontal section taken on line 15—15 of Figure 13, Figure 16 is an exploded perspective view of a rib, resilient frame or hoop, and connecting strip, Figure 17 is a perspective view of the rib, resilient frame or hoop and connecting coupling, parts broken away.

This application is a continuation in part of my application for Ladies' Girdles, Serial Number 386,241, filed October 15, 1953.

Attention being called first to Figures 1 to 11a inclusive, the numeral 25 designates the body portion of a girdle, and this body portion is preferably formed of an elastic fabric having vertical and horizontal stretch. The fabric may be woven or knit. While the body portion 25 is shown without a back panel, a back panel may be provided, if desired.

The body portion 25 is provided at its top with side pocket sides 26 and back pocket sides 27, extending above the body portion 25 before they are folded over and stitched in place. The top of the body portion 25 is folded inwardly over a horizontal line 28 to form an upper folded edge 29, and the pocket sides 26 and 27 are positioned opposite the body portion 25. These parts are secured together by a zig-zag line of stitching 30, which follows the edge of the folded edge 29 and the edges of the pocket sides 26 and 27. This arrangement provides side pockets 26a, disposed adjacent to the hip joints, and a center back pocket 27a. The line of stitching 30 is interrupted at 31 to provide an opening for the insertion of a resilient frame or hoop into each pocket 26a and 27a. The frame or hoop is designated 32, and is formed of a resilient wire bent into zig-zag formation, providing alternately arranged oppositely facing loops which are generally radial. The ends of the frame or hoop 32 are connected by a clamp 33, which is tubular and is rigidly secured thereto. The frames or hoops 32 may be inserted into the pockets 26a and 27a before or after the body portion 25 is attached to a front panel, to be described.

The numeral 34 designates a front panel, which is preferably non-elastic. Arranged upon the inner face of the front panel are tapes 35, which are stitched to the front panel at 36, forming vertical rib receiving pockets 36a, closed at their tops and open at their bottoms. After the tapes are stitched to the front panel, the front panel may be arranged in superposed relation with a fabric section 37, and the front panel is then stitched at 38 to the fabric section 37, and the front panel 34 is then folded downwardly, Figure 4, and the fabric section 37 is folded downwardly at the line of stitching 38 forming sides 39 and 40 of a pocket 41. The ends of the sides 39 and 40 are stitched together by a vertically curved line of stitching 42, and this line of stitching does not pass through the front panel 34. The pocket 41 formed by the sides 39 and 40 is therefore closed at its top and bottom, and the front panel 34 extends downwardly beyond the pocket 41.

A resilient frame or hoop device 43 is inserted into the pocket 41 through either open side edge, and the side edges of the sides 39 and 40 and the sides edges of the front panel 34 are all secured to the elastic body portion 25 by means of zig-zag lines of stitching 44. The lines of stitching 44 extend downwardly beyond the bottom of the pocket sides 39 and 40 and terminate at the bottom of the front panel 34, as shown. After the panel and pocket have thus been stitched to the body portion 25, stiffening ribs 45 are inserted into the vertical pockets 36a through the lower open ends of these pockets, which open ends are then sewed closed. The ribs 45 have their upper ends arranged forwardly of the bottom of the hoop device 43, and these upper ends project above the bottom of the frame or hoop device for a substantial distance, as shown. The intermediate rib 45 has its upper end extending above the upper ends of the outer ribs 45 and the lower end of the intermediate rib extends below the lower ends of the outer ribs. The function of these ribs 45 is to prevent the lower end or bottom of the frame or hoop device 43 moving outwardly when the wearer stoops forwardly or sits, and they also serve as body control, to exert pressure upon the abdomen to flatten the same when standing or at all times, to some extent.

The frame or hoop device 43 comprises upper and lower frame or hoop sections 46 and 47, which are resilient. The lower hoop section 47 is preferably larger than the upper hoop section. Each frame or hoop section is formed of wire, which is bent into a zig-zag formation, producing oppositely facing alternate loops 48 and 49, which are generally radial. The ends of each frame or hoop section interfit, Figure 5, to prevent separation in a generally horizontal direction. The bottom of the upper frame or hoop section 46 and the top of the lower frame or hoop section 47 are connected by a stiff coupling 50, preferably formed of metal, and which is tubular. This coupling is pinched shut upon the frame or hoop sections 46 and 47 and has clamping engagement therewith and is accordingly rigidly connected with these frame or hoop sections and also rigidly connect them. Since the coupling 50 connects the ends of each frame or hoop section, it prevents distortion of each frame or hoop section so that the same returns to a flat position within a single plane when released. When the wearer stoops forwardly, the upper frame or hoop section 46 turns about its lower portion or bottom and also about the top of the lower frame or hoop section 47. The turning movement of the upper frame or hoop section is opposed by a torsional action at the bottom of the upper frame or hoop section and the top of the lower frame or hoop section, and this torsional action quickly returns the frame or hoop section to the raised position when the pressure is removed.

The body encircling portion 25 has a longitudinal axis which may be substantially vertical in use, and the hoop sections 46 and 47 have horizontal diameters at right angles to the longitudinal axis and vertical diameters at right angles to the horizontal diameters. The horizontal diameters may be slightly longer than the vertical diameters. When the horizontal diameter of the frame is substantially as long as the vertical diameter, or longer, the frame will then have the maximum degree of flexibility and the minimum pressure will be required to vertically compress the frame. The substantially U-shaped loops extend throughout substantially the entire area of the frame. The substantially U-shaped laterally extending loops extend throughout the entire length of the sides of the frame. The said sides are longitudinally curved throughout the major portion of their lengths, and these curved sides, in use, are free to move outwardly when the top of the frame is depressed, since these sides are spaced from the edges of the pocket, before the frame is vertically depressed.

Figure 1:
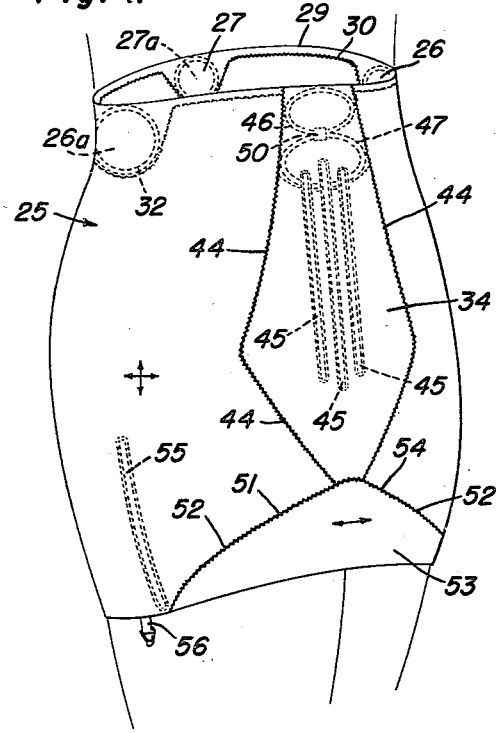
Figure 2:
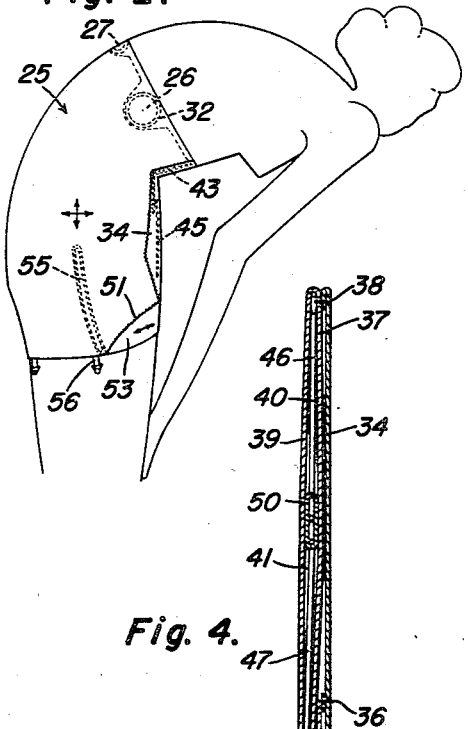
Figure 3:
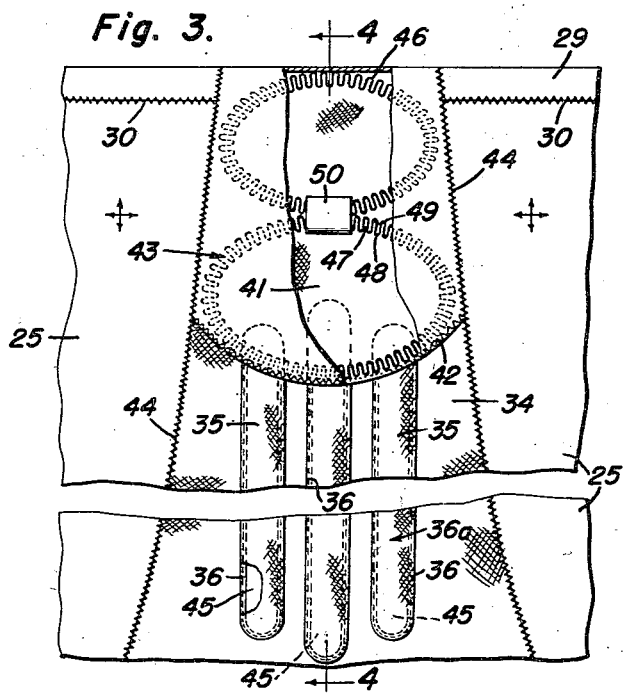
Figure 4:
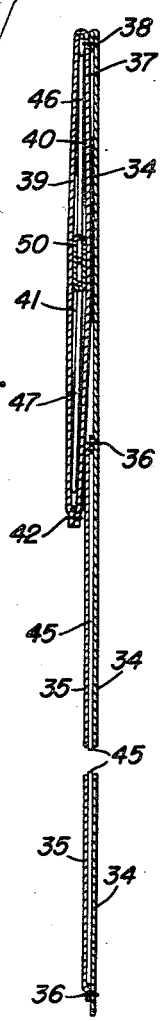
Figure 4 is a vertical section taken on line 4—4 of Figure 3.
Figure 5:
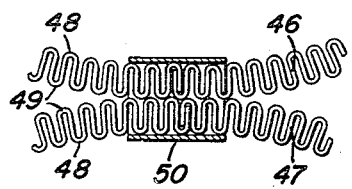
Figure 5 is a side elevation of the upper and lower resilient frames or hoops removed, the coupling being shown in section and parts broken away.
Figure 6:
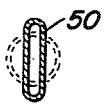
Figure 6 is a transverse section through the coupling.

The frame or hoop 32, which is inserted in each of the pockets 26a and 27a is identical with the hoop section 46, and is of the zig-zag formation, and its ends interfit, as shown in Figure 5, and these ends are connected by the metal coupling 33 which is rigid, is tubular, and is clamped to such end. This coupling is identical to the coupling 50 except that it is not as wide.

At its bottom and front, the body portion 25 is provided with a large opening 51, which has a substantially vertical dimension and is sufficiently horizontally long to extend to points near and spaced from the sides of the body portion 25. This opening 51 has inclined edges 52, which diverge downwardly. The opening 51 is covered by a section of fabric 53, which is horizontally extensible and is preferably horizontally elastic. The horizontal strength of the section 53 against horizontal stretching is much weaker than that of the body portion 25. The fabric section 53 is horizontally elastic and may be woven or knit and is secured to the body portion 25 by a line of stitching 54 which follows the edge 52.

Arranged near the opposite ends of the weak fabric section 53 are upstanding stiffening ribs 55, suitably secured to the body portion 25. These ribs extend to the bottom of the body portion. Front hose supporters 56 are secured to the bottom of the body portion 25 adjacent to the ribs 55 and the ends of the fabric section 53.

The purpose of the large front opening 51 is to promote freedom of action of the legs. The pull or tension of the body portion 25 near its bottom extends around the bottom edge of the body portion 25 at its sides and back, and also downwardly in an outwardly diverging direction along the edge 52. The upstanding ribs 55 serve to hold the bottom of the body portion 25 downwardly at the front of the garment and adjacent to the weak fabric section 53, and thus properly distributes the pull or tension of the body portion 25 near the bottom of the body portion and throughout the length of the ribs 55. The hose supporters 56 would also aid in holding the front of the body portion 25 down, and hence aid in the proper distribution of the pull or tension of the body portion near the bottom. The weak fabric section 53 covers the opening 51, but is not sufficiently strong to perceptibly impair the freedom of movement of the legs.

In use, the frames or hoops 32 within the pockets 26a and 27a, serve to prevent rolling of the top of the body portion. Each frame or hoop 32 is vertically resilient, and is held within its pocket, properly centered by contact with the curved bottom of the pocket. There is ample space between the sides of each frame or hoop 32 and the side edge of the pocket, and the frame or hoop may be readily vertically compressed, and its sides will shift outwardly. The frame or hoop is preferably under compression to some extent when installed within its pocket and is somewhat horizontally elongated.

The resilient device 43 at the front of the garment, is also under compression when installed in the pocket. Its upper and lower frame or hoop sections 46 and 47 are under compression and may be horizontally elongated. The lower frame or hoop section 47 engages the curved line of stitching 42 and holds the device properly centered, and its top bears against the top of the pocket 41. When the frame or hoop sections 46 and 47 are vertically compressed, their sides are free to shift horizontally in an outward direction. This renders the frame or hoop sections resilient and they quickly return to the raised position when released. When the user stoops forwardly, the upper and lower hoop sections 46 and 47 bend forwardly. The upper hoop section turns about its bottom portion, which then has a torsional action, and the upper frame or hoop section also turns about the top of the lower frame or hoop section 47 which has a torsional action. These torsional actions are effected by the coupling 50 which connects the bottom of the upper frame or hoop section and the top of the lower frame or hoop section 47. The lower frame or hoop section 47 may also be bent forwardly between its top and bottom, and the ribs 45 prevent the bottom of the frame or hoop section 47 moving outwardly.

In Figures 11 to 17 inclusive, a girdle is shown comprising the same body portion 25, as shown in Figures 1 to 10 inclusive and 11a and this body portion is equipped at its top with the same pockets 26a, at its sides and back, holding the resilient frames or hoops 32. The body portion 25 is provided in its bottom and front with the same large opening 51, and horizontally elastic fabric sections 53, ribs 55, and front hose supporters 56, as described in connection with the first form of the invention.

In Figures 11 to 17 inclusive, the numeral 57 designates a front panel, preferably formed of non-elastic fabric, and the top of this panel is stitched to a pocket side 60, at 59, and the front panel 57 is folded downwardly over the pocket side 60, as shown. The numeral 61 designates a coacting pocket side. The pocket sides 60 and 61 are connected between their ends by a vertically curved line of stitching 62, forming a pocket 63. This line of stitching 62 is interrupted at 64, as shown. The pocket sides 60 and 61 are also secured together by vertical lines of stitching 65, forming rib receiving pockets 66. These rib receiving pockets are adapted to receive substantially vertical ribs 67 and 68. The outer pockets 66 may have their upper ends stitched closed and when the ribs 67 are inserted therein, the lower ends of these pockets are then stitched closed. The upper end of the intermediate pocket 66 is formed open and its lower end may also be left open, or it may be stitched closed. An intermediate rib 68 is inserted in the intermediate pocket 66. The rib 68 extends at its top and bottom beyond the outer ribs 67. The lines of stitching 62 and 65 do not extend through the panel 57. The edges of the pocket sides 60 and 61 extend to the edges of the panel and the edges of the pocket sides and the edges of the panel 57 are all stitched to the edges of the body portion 25 by zig-zag lines of stitching 69. The lower ends of the pocket sides are also secured together by a transverse line of stitching 70 which does not pass through the panel 57. The ribs 67 and 68 are resilient but sufficiently stiff to afford body control. The upper end of the pocket 63 is formed open, and will be closed, as described.

Arranged within the pocket 63 is a resilient frame or hoop 71, formed of wire, which is bent into a zig-zag formation throughout its entire length forming alternate oppositely facing loops 72 and 73. These loops and all portions of the frame or hoop are in the same plane when not under tension and the frame or hoop is therefore flat. The frame or hoop 71 bears at its top against the top of the pocket 63, when the top is closed, and at its bottom against the curved line of stitching 62, which holds the resilient frame or hoop centered. The frame or hoop is permanently under compression.

At its top, the intermediate stiffening rib 68 is provided with a transverse slot 74, Figures 13, 16 and 17, to receive a metal strip 75 which is then bent to form a lower U-shaped portion 76 and is further bent to form an upper U-shaped portion 77, receiving therein the bottom of the resilient frame or hoop 71. This metal strip is thus formed into a stiff coupling or loop and the sides of this coupling are clamped to the stiffening rib 68 and to the frame or hoop 71, and are rigidly connected therewith and rigidly connect the lower end of the frame or hoop 71 with the rib 68. The coupling including the U-shaped portions 76 and 77 is rigid, as stated. The ends of the frame or hoop 71 including the transverse loops, interfit, as shown in connection with Figure 5, and these ends cannot separate. The top of the pocket 63 is formed open, as stated, and the rib 68 is passed through this pocket into the intermediate rib receiving pocket 66, and the frame or hoop 71 is introduced into the pocket 63, after which the top of the pocket is closed by a line of stitching 63'.

In use, the frame or hoop 71 opposes the downward movement of the top of the panel 57 and pocket 63, and will return the same to the raised position after it is depressed and released. Vertical downward pressure upon the frame 71 will cause the side portions thereof to move outwardly in a horizontal direction. This renders the frame or hoop 71 highly vertically resilient which promotes the comfort of the user. Since the bottom of the frame or hoop 71 is rigidly secured to the rib 68, this rib tends to hold the lower portion against turning upon its generally horizontal axis, producing a torsional action in the lower portion of the frame or hoop 71. This will permit the entire frame or hoop 71 to readily bend forwardly when the wearer stoops but will quickly return it to the raised position when the pressure is released. The rib 68 also prevents the lower portion of the frame or hoop 71 moving forwardly from the wearer.

It is to be understood that the forms of my invention herewith shown and described are to be taken as preferred examples of the same, and that various changes in the shape, size or arrangement of parts may be resorted to, without departing from the spirit of my invention or the scope of the subjoined claims.

Having thus described my invention, I claim:

1. A girdle or like garment comprising a flexible body portion which tends to roll at its top, a resilient frame secured to the front of the body portion and bearing against the top, said frame being of zig-zag formation and including alternate oppositely facing loops, a rib secured to the front and extending below the frame and a coupling secured to the top of the rib and to the bottom of the frame.

2. A girdle or like garment comprising a flexible body encircling portion which tends to roll at its top, resilient supporting means secured to the body encircling portion and serving to oppose such rolling action, said resilient supporting means including upper and lower frame sections, the upper frame section including generally radial substantially U-shaped loops which are connected at their outer ends, said generally radial loops extending throughout the bottom of the upper frame section, said lower frame section including generally radial substantially U-shaped loops which are connected at their outer ends, the radial loops of the lower frame section extending throughout the top of the lower frame section, and a stiff coupling element connecting the bottom of the upper frame section and the top of the lower frame section adjacent to their longitudinal centers and engaging with certain of the radial loops in said bottom and top for holding such engaged loops against turning movement with respect to the coupling, said coupling being positioned near the elevation of that portion of the body where the most bending occurs, the substantially U-shaped loops in said bottom extending for a substantial distance beyond each end of the coupling element and the substantially U-shaped loops in said top extending for a substantial distance beyond each end of the coupling element, the arrangement being such that the torsional action occurs in said substantially U-shaped loops arranged exteriorly of said coupling element when a relative angular movement is effected between the upper and lower frame sections.

3. A girdle or the like comprising a flexible body encircling portion having an upper end which is depressed by the movement of the body, resilient means to oppose such downward movement of said upper end, said resilient means including upper and lower generally circular hoops, each hoop including generally radial substantially U-shaped loops extending throughout substantially the circumference of each hoop, the upper hoop including a bottom provided with said generally radial loops and the lower hoop including a top provided with said generally radial loops, the top and bottom being positioned near the elevation of that portion of the body where the most bending occurs, and a stiff coupling connecting said bottom and top near their longitudinal centers and engaging the generally radial loops at such longitudinal centers so that the engaged loops cannot swing with respect to such stiff coupling, the generally radial loops in said bottom extending for a substantial distance beyond each end of the coupling and the generally radial loops in said top extending beyond each end of said coupling, the arrangement being such that the torsional action occurs in said generally radial loop exteriorly of the ends of said coupling when one hoop is swung transversely with relation to the other hoop.

4. A girdle or like garment comprising a flexible body encircling portion including a front having a top which tends to be depressed in use, resilient hoop means mounted upon the front and bearing against said top to oppose its downward movement, said resilient hoop means including generally radial substantially U-shaped loops, said resilient hoop means being foldable near its vertical center and having its vertical center arranged near the waist line of the wearer where most bending occurs, and stiffening rib means secured to said front and connected with the bottom only of the resilient hoop means, said stiffening rib means extending over a portion of the abdomen for effecting body control.

5. A girdle or like garment comprising a flexible body encircling portion having a top which is depressed in use, resilient supporting means mounted upon the body encircling portion and bearing against said top to oppose its downward movement, said resilient supporting means comprising upper and lower frame sections, the upper frame section including generally radial loops extending throughout its bottom, the lower frame section including generally radial loops extending throughout its top, the top and bottom being positioned near the elevation of that portion of the body where the most bending occurs, a stiff coupling connecting the bottom and top near their longitudinal centers and engaging the generally radial loops at such longitudinal centers, the radial loops of said bottom extending for a substantial distance beyond each end of the coupling and the radial loops of said top extending for a substantial distance beyond each end of said coupling, means to secure the frame sections to the body encircling portion, and stiff body control means extending beneath the lower frame section and bearing against the bottom only of the lower frame section to hold such bottom against moving from the wearer.

6. The combination with the flexible body receiving portion of a girdle having a top, of a resilient hoop which is generally circular when applied to the flexible body receiving portion, said hoop having a horizontal diameter in use which is at least as long as its vertical diameter, said resilient hoop including generally radially substantially U-shaped loops which are connected at their outer ends, said loops extending throughout substantially the circumference of the hoop, said loops being arranged in the plane of the hoop so that the hoop is substantially flat, and means to secure the hoop to the flexible body encircling portion so that said hoop retains its generally circular shape in use and the sides of the hoop are free to move outwardly in a generally horizontal direction when the top of the hoop is vertically depressed, said hoop opposing the downward movement of said top.

7. The combination with a flexible body receiving portion of a girdle having a top, of means forming a pocket upon the body receiving portion and extending adjacent to said top, a resilient hoop which is generally circular when applied to the flexible body receiving portion, said hoop being arranged within said pocket and having sides slidable within the pocket and moved generally outwardly when the top of the hoop is depressed, said resilient hoop including generally radial substantially U-shaped loops which are connected at their outer ends, said loops extending throughout substantially the circumference of the hoop, said hoop being substantially flat, said hoop opposing the downward movement of said top.

8. A girdle or like garment comprising a flexible body portion which tends to roll at its top, means for forming a pocket upon the flexible body portion adjacent to said top, a resilient hoop mounted within the pocket and adapted to bear against the top and bottom of the pocket, said hoop being normally flat and including sides which are of zig-zag formation throughout the major portion of their length and include alternately arranged oppositely facing loops which are generally radial, said loops being arranged in the plane of the hoop, the upper portion of said pocket extending circumferentially beyond the upper portion of said sides and said upper portion of said sides being slidably mounted within the pocket so that said upper portions move generally horizontally when the top of the hoop is depressed, and rib means secured to the body portion and extending below said resilient hoop and connected with the lower portion of said resilient hoop to oppose the lateral movement of said lower portion of the hoop from the body.

9. A girdle or like garment comprising a flexible body portion which tends to roll at its top, a resilient supporting element secured to the body portion and adapted to bear against said top, said resilient supporting element comprising an upper section having a closed top and a closed bottom, a lower section including a closed top and closed bottom, said upper section bottom and lower section top being arranged near and in superposed relation and being of zig-zag formation throughout the major portions of their lengths and including oppositely facing U-shaped loops, the outer end portions of said upper section bottom and lower section top being separate, and means arranged near the center of the upper section bottom and lower section top and connecting certain of the U-shaped loops, portions of the upper section bottom and lower section top outwardly of said means being free to have torsional action.

10. A girdle or like garment comprising a flexible body portion having a top which is depressed in use, a resilient hoop mounted upon the front of the body portion near said top and tending to support the top, and stiffening ribs secured to said front and extending across the bottom of said resilient hoop and opposing the movement of such bottom from the body.

References Cited in the file of this patent

UNITED STATES PATENTS

| | | |
|---|---|---|
| 388,160 | Torley | Aug. 21, 1888 |
| 1,994,941 | Caldor | Mar. 19, 1935 |
| 2,501,899 | Herbener | Mar. 28, 1950 |
| 2,583,225 | Murphy | Jan. 22, 1952 |
| 2,632,891 | Herbener | Mar. 31, 1953 |
| 2,644,946 | Menz et al. | July 14, 1953 |